United States Patent
Stoehr

(10) Patent No.: US 8,897,957 B2
(45) Date of Patent: Nov. 25, 2014

(54) CONTROL AND MONITORING DEVICE OF A VEHICLE HAVING A TIRE-MONITORING CONTROL UNIT AND A BRAKE CONTROL UNIT INTEGRATED IN A SUBASSEMBLY

(75) Inventor: Markus Stoehr, Stuttgart (DE)

(73) Assignee: Knorr-Bremse Systeme Fuer Nutzfahrzeuge GmbH, Munich (DE)

(*) Notice: Subject to any disclaimer, the term of this patent is extended or adjusted under 35 U.S.C. 154(b) by 607 days.

(21) Appl. No.: 12/658,061

(22) Filed: Feb. 1, 2010

(65) Prior Publication Data

US 2010/0292898 A1    Nov. 18, 2010

(30) Foreign Application Priority Data

Feb. 11, 2009   (DE) .................... 10 2009 008 342

(51) Int. Cl.
| G06F 7/00 | (2006.01) |
| G06F 17/00 | (2006.01) |
| B60R 22/00 | (2006.01) |
| B60T 8/17 | (2006.01) |
| B60C 23/04 | (2006.01) |
| B60C 23/00 | (2006.01) |

(52) U.S. Cl.
CPC ......... B60T 8/1708 (2013.01); B60C 23/0408 (2013.01); B60C 23/009 (2013.01)
USPC ............................................. 701/36; 701/48

(58) Field of Classification Search
None
See application file for complete search history.

(56) References Cited

U.S. PATENT DOCUMENTS

| 5,050,110 A | * | 9/1991 | Rott ............................. 702/130 |
| 7,778,741 B2 | * | 8/2010 | Rao et al. ......................... 701/1 |
| 2007/0241868 A1 | * | 10/2007 | Fackrell et al. ............... 340/431 |
| 2008/0216567 A1 | * | 9/2008 | Breed ......................... 73/146.5 |

FOREIGN PATENT DOCUMENTS

| DE | 101 52 590 | 10/2001 |
| EP | 0 330 149 | 2/1989 |

OTHER PUBLICATIONS

"The Automotive Handbook of Robert Bosch GmbH", 26th edition, Jan. 2007, pp. 810-811.

* cited by examiner

Primary Examiner — Paul Danneman
(74) Attorney, Agent, or Firm — Kenyon & Kenyon LLP

(57) ABSTRACT

A control and monitoring device of a vehicle, including at least one controlled brake system (ABS, EBS), which during braking adjusts the brake slip and/or the brake pressure to a setpoint value, including at least one brake control device (ECU-EBS, ECU-TEBS) as well as a device (TPMS) for monitoring the tire pressure and/or the tire air temperature of at least one tire, including at least one tire sensor, which transmits a signal representing the individual tire pressure and/or the individual tire air temperature of the particular tire, to at least one tire-monitoring control unit (ECU-TPMS). The at least one tire-monitoring control unit (ECU-TPMS) and the at least one brake control unit (ECU-EBS, ECU-TEBS) are integrated in one subassembly and are configured for the exchange of data among each other.

20 Claims, 1 Drawing Sheet

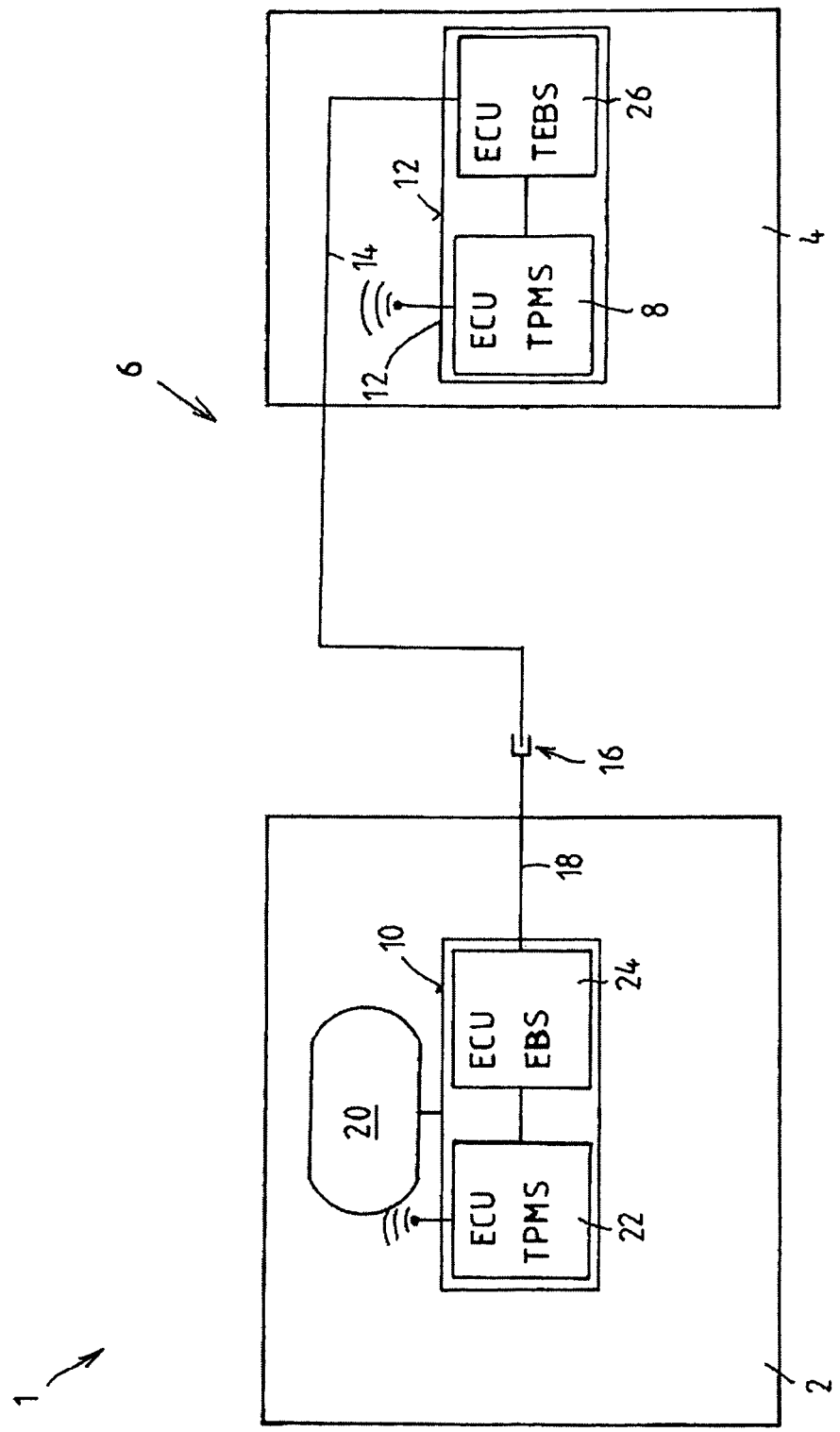

CONTROL AND MONITORING DEVICE OF A VEHICLE HAVING A TIRE-MONITORING CONTROL UNIT AND A BRAKE CONTROL UNIT INTEGRATED IN A SUBASSEMBLY

RELATED APPLICATION INFORMATION

The present application claims priority to and the benefit of German patent application no. 10 2009 008 342.1, which was filed in Germany on Feb. 11, 2009, the disclosure of which is incorporated herein by reference.

FIELD OF THE INVENTION

The present invention relates to a control and monitoring device of a vehicle, including at least one controlled brake system (ABS, EBS), which during braking adjusts the brake slip and/or or the brake pressure to a setpoint value, including at least one brake control unit (ECU-ABS, ECU-EBS) as well as a device for monitoring the tire pressure and/or the tire air temperature of at least one tire having at least one tire sensor, which transmits a signal representing the individual tire pressure and/or the individual tire air temperature of the particular tire to at least one tire-monitoring control unit.

BACKGROUND OF THE INVENTION

From the related art, e.g., the Automotive Handbook of Robert Bosch GmbH, $26^{th}$ edition, January 2007, pages 810 and 811, tire-pressure control systems (tire pressure monitoring system TPMS) are discussed for monitoring the tire pressure in vehicles; these systems are meant to prevent tire defects resulting from insufficient tire pressure and thereby reduce the number of accidents attributable to defective tires.

Operating a vehicle at insufficient tire pressure will result in greater flexing work along the sides of the tire and thus in increased wear of the tires. At high accelerations a tire weakened in this manner may possibly no longer be able to withstand the stressing and burst. Following an increase in serious accidents with fatalities in the U.S. due to burst tires resulting from reduced pressure, a law has been passed (NHTSA Tead Act), which regulates the introduction of tire-pressure control systems across the entire U.S.A. in order to provide drivers with an early warning in the future if reduced tire pressure is detected. As of September, 2007, all new vehicles must be equipped with tire-pressure control systems. In addition to tire damage, "creeping flats" due to the gas diffusion through the tire rubber over time are a major cause of decreased tire pressure.

However, the tire inflation pressure is not only an important variable for traffic safety. The inflation pressure clearly affects driving comfort, tire service life and fuel consumption as well. A decrease of 0.6 bar in the inflation pressure may increase the fuel consumption by up to 4% and shorten the service life of the tire by up to 50%.

The increasing percentage of tires having emergency running properties likewise necessitates the use of tire-pressure control systems because the driver of a vehicle is no longer able to detect a tire having considerably reduced pressure (flat tire) based on the driving behavior. To prevent drivers from unknowingly exceeding the speed and distance limits that apply in such a case, emergency-running tires may only be used in conjunction with tire-pressure control systems or flat-rolling warners.

In direct tire-pressure control systems, a separate sensor module including a pressure sensor is installed in each tire of the vehicle. Via a coded high-frequency transmission link, data from the tire interior, such as tire pressure and tire air temperature, is transmitted by this module to a control unit. These data may be analyzed in the control unit, thereby detecting not only pressure losses in individual tires but also slow pressure losses in all tires (for instance due to diffusion through the rubber). If the tire pressure drops below a specified threshold or if the pressure gradient exceeds a specific value, then the driver is warned by a visual or acoustic signal.

The sensor module is normally fixed in place in the tire together with the tire valve. The modules are usually supplied by a battery. This results in additional demands with regard to power consumption, media resistance and acceleration sensitivity in comparison with other applications. Micromechanical absolute-pressure sensors are used as sensor element.

The data measured inside the tire with the aid of pressure and temperature sensors are processed in the sensor module, modulated upon an HF carrier signal (433 MHz in Europe, 315 MHz in the U.S.), and emitted via an antenna. This signal is detected either via individual antennas on the wheel wells or in a central receiver (e.g., in the control unit of existing remote keyless entry systems).

Furthermore, in commercial vehicles conventional brake systems, activated and controlled purely via a pressure arrangement, are supplemented by anti-lock braking systems (ABS) or have been replaced by electronically controlled brake systems (EBS) having integrated ABS. Both systems are controlled brake systems; in an anti-lock braking system (ABS) an ABS control unit adjusts the slip of braked wheels as a function of a deviation between the actual slip and a setpoint slip, either singly or per axle, and in an electronically controlled brake system (EBS), an EBS brake control unit adjusts the brake pressure in brake cylinders of braked wheels as a function of a deviation between the actual brake pressure and a setpoint brake pressure.

At present, the sectors of the controlled brake systems—EBS having integrated ABS or ABS alone—for one, and the tire-pressure control systems or the tire-pressure regulation systems, for another, are separate from one another.

SUMMARY OF THE INVENTION

In contrast, an object of the exemplary embodiments and/or exemplary methods of the present invention is to further develop a control and monitoring device of a vehicle of the type mentioned in the introduction, in such a way that it has a less complex and a more compact design. Furthermore, it is to have an expanded functionality.

According to the exemplary embodiments and/or exemplary methods of the present invention, this object is achieved by the features described herein.

The exemplary embodiments and/or exemplary methods of the present invention provides that the at least one tire-monitoring control unit and the at least one brake control unit are integrated in one subassembly and configured for the exchange of data with each other.

The advantages to be achieved by the exemplary embodiments and/or exemplary methods of the present invention, for one, are that the shared use of components such as power supply units, housings etc. lowers the production cost. For another, the direct communication between the tire-monitoring control unit and the brake control unit permits new functionalities as enumerated in the following text within the framework of specific embodiments.

For example, in brake control units of current, electronically controlled brake systems EBS, routines are usually implemented with whose aid the brake disk temperature of a brake disk of a disk brake of the vehicle is able to be estimated using an estimation algorithm on the basis of brake and vehicle parameters such as braking duration, brake pressure, deceleration and vehicle loading.

If the brake control unit and the tire-monitoring control unit are then integrated in one subassembly and designed to exchange data among each other, routines for verifying the estimated brake-disk temperature on the basis of the measured tire air temperature of the tire associated with the brake disk are additionally able to be implemented in the brake-control unit and/or in the tire-monitoring control unit. This provides a simple control possibility for checking the estimated values for the brake disk temperature, thereby increasing the fault tolerance of the brake system, in particular.

Therefore, the controlled brake system may be an electronically controlled brake system (EBS) having at least one brake control unit which, in the manner described earlier, and adjusts a brake pressure in the wheel brakes as a function of a deviation of an actual brake pressure from a setpoint brake pressure.

However, if the controlled brake system is merely an anti-lock brake system (ABS) for the slip-controlled deceleration of the vehicle, equipped with an ABS control unit which adjusts a brake slip in the wheel brakes as a function of a deviation of an actual slip from a setpoint slip, then not all data on the basis of which the brake disk temperature of a brake disk of a disk brake of the vehicle is able to be estimated using an estimation algorithm is available to such an ABS system because data about the brake pressure is generally not provided in an ABS brake control unit.

In this case the value for the tire air temperature utilized by the tire-monitoring control unit can be used to estimate the brake disk temperature of the brake disk assigned to the tire, which in turn increases the fault tolerance of the brake system. For an excessively high tire air temperature allows an increased brake disk temperature to be inferred.

The measures set forth in the dependent claims allow for advantageous further developments and improvements of the invention specified in the independent claims.

According to a specific embodiment, the vehicle is represented by a tractor vehicle/trailer combination, the trailer being provided with at least one tire sensor assigned to a trailer tire, and with a trailer tire-monitoring control unit for transmitting a signal to the trailer tire-monitoring control unit in a wireless manner, the signal representing the individual tire pressure and/or the individual tire air temperature of the respective trailer tire, and the tractor vehicle being equipped with at least one tire sensor assigned to a tractor vehicle tire, and with a tractor vehicle tire-monitoring control unit for transmitting a signal to the tractor vehicle tire-monitoring control unit in a wireless manner, the signal representing the particular tire pressure and/or the particular tire air temperature of the particular trailer tire.

In this case, the tractor vehicle tire-monitoring control unit and the trailer tire-monitoring control unit may be configured to communicate with one another in a wireless manner via a high-frequency link, in such a way that at least data regarding the tire pressure and/or the tire air temperature of at least one trailer tire are able to be transmitted to the tractor vehicle tire-monitoring control unit. There, these data are then able to be displayed to the driver by a display device.

Furthermore, in such a tractor vehicle/trailer combination according to the related art, the tractor vehicle is equipped with a tractor vehicle brake control unit, and the trailer is equipped with a trailer brake control unit, a communication or a data exchange between the two control units usually taking place in a wire-bound manner through a data bus (ISO 11992), which is routed via a coupling between the tractor vehicle and the trailer. On the one hand, the setpoint brake value, which is generated in the brake control unit of the tractor vehicle based on the driver input, is transmitted in the form of an electrical signal via the data bus to the brake control unit of the trailer in order to generate a corresponding brake pressure for the trailer brake cylinders in the brake modules of the trailer. On the other hand, a control pressure corresponding to the setpoint brake pressure and generated parallel to the electrical signal is input into the trailer brakes via a pneumatic coupling, as underlaid security level in case the primary electrical control of the trailer brakes malfunctions.

An additional wireless data exchange may then be provided between the tractor vehicle brake control unit and the trailer brake control unit, in that the tractor vehicle brake control unit communicates with the tire-monitoring control unit of the tractor vehicle, and the trailer brake control unit communicates with the tire-monitoring control unit of the trailer, in such a way in each case that data about the controlled brake system of the tractor vehicle and the controlled brake system of the trailer are transmitted between the trailer-vehicle tire monitoring control unit and the trailer tire-monitoring control unit by way of the wireless high-frequency link.

The wireless data exchange between the controlled brake system of the trailer and the controlled brake system of the tractor vehicle then represents a redundant, or parallel, data link with respect to a wire-bound data exchange via the data bus (ISO 11992) between the tractor vehicle and the trailer. A data exchange between the electronically controlled brake system of the trailer and the electronically controlled brake system of the tractor vehicle may then take place even in a situation in which the data bus (ISO 11992) installed between the tractor vehicle and the trailer is interrupted or is not connected at the coupling between tractor vehicle and trailer, thereby significantly increasing the fault tolerance of the electronically controlled brake system of the tractor vehicle/trailer combination.

The data regarding the controlled brake system of the trailer may also include diagnosis and/or fault data pertaining to the controlled brake system of the trailer, and the data may be read out from a diagnosis and/or fault memory of the trailer brake-control unit and transmitted via the wireless high-frequency link between the tractor vehicle tire-monitoring control unit and the trailer tire-monitoring control unit, to the tractor vehicle brake-control unit or to a separate, portable diagnosis device not tied to the vehicle, for evaluation and/or display purposes. An externally accessible jack frequently provided in modern trailers for the readout of data for the diagnosis or for a fault search of the trailer brake system may be dispensed with in this case, which saves material costs for plug pins, cables and the jack, and installation costs as well.

According to one further development of the specific embodiment, the tractor vehicle brake control unit is integrated together with the tire-monitoring control unit of the tractor vehicle in one subassembly, and the trailer brake control unit is integrated together the tire-monitoring control unit of the trailer in one subassembly and developed for the exchange of data among each other.

Further details are derived from the following description of an exemplary embodiment.

An exemplary embodiment of the present invention is illustrated in the drawing and explained in greater detail in the following description.

BRIEF DESCRIPTION OF THE DRAWING

The FIGURE shows a schematic illustration of a control and monitoring device of a tractor vehicle/trailer combination.

DETAILED DESCRIPTION

Tractor vehicle/trailer combination 1 shown only schematically in FIG. 1 is made up of a tractor vehicle 2 and a drawbar trailer 4, for example. Other combinations, e.g., made up of a tractor unit 2 and a semi trailer 4, are possible as well.

A control and monitoring device 6 of tractor vehicle/trailer combination 1 includes a device TPMS (trailer tire pressure-monitoring system) for monitoring the tire pressure and/or the tire air temperature of at least one tire (not shown here) of tractor vehicle 2 or trailer 4. Toward this end, TPMS is equipped with at least one (also not shown here but easily imaginable) tire sensor, which transmits a signal representing the individual tire pressure and/or the individual tire air temperature of the respective tractor vehicle tire or trailer tire, to a trailer tire-monitoring control unit ECU-TPMS trailer 8 or to a tractor vehicle tire-monitoring control unit ECU-TPMS truck 22.

The tire sensors assigned to the trailer tires and trailer tire-monitoring control unit ECU-TPMS 8 are accommodated in trailer 4, the tire sensors assigned to the tractor vehicle tires, and the tractor vehicle tire-monitoring control unit ECU-TPMS 22 are accommodated in tractor vehicle 2.

At least one tire sensor of a trailer tire and trailer tire-monitoring control unit ECU-TPMS trailer 8 are designed to wirelessly transmit a signal to trailer tire-monitoring control unit ECU-TPMS 8, the signal representing the particular tire pressure and/or the particular tire air temperature of the relevant trailer tire. Furthermore, tractor vehicle tire-monitoring control unit ECU-TPMS 22 disposed on or inside tractor vehicle 2 is likewise designed to have signals applied for the tire pressure and/or the tire air temperature, the signals coming from tire sensors (not shown here) assigned to the tractor vehicle tires.

Furthermore, tractor vehicle tire-monitoring control unit ECU-TPMS 22 and trailer tire-monitoring control unit ECU-TPMS 8 disposed on or in trailer 4 are designed to communicate with one another in a wireless manner by way of a high-frequency link HF, which is symbolically indicated by antennas in the FIGURE.

For instance, values for the tire pressure and/or the tire air temperature of at least one trailer tire are then able to be transmitted in a wireless manner from trailer tire-monitoring control unit ECU-TPMS 8 to tractor vehicle tire-monitoring control unit ECU-TPMS 22 and may be displayed them on a display device 20 on or in tractor vehicle 2, especially in the driving cab, so that the driver is aware of the tire pressure and the tire air temperature of the tractor vehicle tires and the trailer tires at all times. In addition or alternatively, a telematic system may also transmit these values wirelessly to a master station for remote monitoring.

Furthermore, control and monitoring device 6 of tractor vehicle/trailer combination 1 includes an electronically controlled brake system EBS known per se, which has at least one brake control unit which regulates a brake pressure in the wheel brakes as a function of a deviation of an actual brake pressure from a setpoint brake pressure. The electronically controlled brake system of tractor vehicle/trailer combination 1 also includes the known functions of an anti-lock braking system ABS. In a tractor vehicle/trailer combination 1 the electronically controlled brake system is made up of controlled brake system EBS of the tractor vehicle and controlled brake system TEBS of the trailer.

In the process, a data bus 14 of trailer 4 communicates with the electronically controlled brake system of trailer TEBS, especially its control unit ECU/TEBS 26, this data bus 14 being in communicating connection with a data bus 18 of tractor vehicle 2 via a closed plug connection 16 when tractor vehicle 2 is linked, and thus in communication with electronically controlled brake system EBS of tractor vehicle 2. In particular, a central brake control unit ECU-EBS 24 of tractor vehicle 2 communicates with a central brake control unit ECU-TEBS 26 of trailer 4 via described data link 14, 16, 18. Data buses 14, 18 are ISO 11992 data buses, in particular.

On the one hand, the setpoint brake value generated in brake control unit ECU-EBS 24 of tractor vehicle 2 on the basis of driver input is transmitted to brake control unit ECU-TEBS 26 of trailer 4 in the form of an electrical signal via data bus 18, plug connection 16 and data bus 14 in order to generate a corresponding brake pressure for the brake cylinders of the trailer in the brake modules of trailer 4. On the other hand, a control pressure corresponding to the setpoint brake pressure and generated parallel to the electrical signal is input in the trailer brakes via a pneumatic coupling (not shown here), as underlaid security level in case the primary electrical control of the trailer brakes malfunction.

According to one further development, the electronically controlled brake system also could include only an anti-lock braking system (ABS) for the slip-controlled deceleration of the vehicle, equipped with at least one ABS control unit, which adjusts a brake slip in the wheel brakes as a function of a deviation of an actual slip from a setpoint slip. At least one ABS control device may be assigned to tractor vehicle 2 and trailer 6 in this case, these ABS control devices then adjusting the brake slip locally, i.e., in vehicle-component-based manner, per wheel or axle.

For one, tractor vehicle tire-monitoring control unit ECU-TPMS 22 and brake control unit ECU-EBS 24 of tractor vehicle 2 are integrated in one subassembly 10 and designed for the exchange of data among each other. For another, trailer tire-monitoring control unit ECU-TPMS 8 and brake control unit ECU-TEBS 26 of trailer 4 are also integrated in one subassembly 12 and designed for the exchange of data among each other.

Routines with whose aid the brake-disk temperature of a brake disk of a disk brake of tractor vehicle 2 or trailer 4 is able to be estimated on the basis of brake and vehicle parameters such as braking duration, brake pressure, deceleration and vehicle loading, using an estimation algorithm, may be implemented in brake control unit ECU-EBS 24 of tractor vehicle 2 as well as in brake control unit ECU TEBS 26 of trailer 4.

If brake control units ECU-EBS 24 and/or ECU-TEBS 26 and tire-monitoring control units ECU-TPMS 22 and ECU TPMS 8 are then each integrated in one subassembly 10, 12, routines for verifying the estimated brake-disk temperature on the basis of the measured tire air temperature of the tire assigned to the brake disk are then also implemented in at least one of brake-control units ECU-EBS 24 and ECU-TEBS 26 and/or in at least one of the tire-monitoring control units ECU-TPMS 22 and ECU-TPMS 8.

An additional wireless data exchange may then be provided between tractor vehicle brake-control unit ECU-EBS 24 and trailer brake-control unit ECU-TEES 26, in that tractor vehicle brake-control unit ECU-EBS 24 communicates with tire-monitoring control unit ECU-TPMS 22 of tractor vehicle 2, and trailer brake-control unit ECU-TEBS 26 communicates with tire-monitoring control unit ECU-TPMS 8 of trailer 4, as symbolically indicated by the connecting bars in the FIGURE, and high-frequency link HF is provided between tire-monitoring control unit ECU-TPMS 8 of trailer 4 and tire-monitoring control unit ECU-TPMS of tractor vehicle 2. This communication between the two brake-control units ECU-EBS 24 and ECU-TEBS 26 therefore takes place indirectly, via the two tire-monitoring control units ECU-TPMS 8, 22.

Data pertaining to controlled brake system EBS of tractor vehicle 2 and/or controlled brake system TEES of trailer 4 may be transmitted between tractor vehicle tire-monitoring control unit ECU-TPMS 22 and trailer tire-monitoring control unit ECU-TPMS 8 via wireless high-frequency link HF and forwarded to brake-control unit ECU EBS 24 or ECU TEBS 26 may be integrated in the subassembly 10 and 12, respectively.

The data regarding controlled brake system TEBS of trailer 2 may also include diagnosis and/or fault data relating to regulated brake system TEBS of trailer 4 and be read out from a diagnosis and/or fault memory of trailer brake control unit ECU-TEBS 26 (not explicitly shown here) and be transmitted via wireless high-frequency link HF between tractor vehicle tire monitoring control unit ECU-TPMS 22 and trailer tire-monitoring control unit ECU-TPMS 8, to tractor vehicle brake control unit ECU-EBS 24 or to a separate, portable diagnosis device not tied to the vehicle, for evaluation and/or display purposes.

The wireless data exchange via high-frequency link HF between controlled brake system EBS of trailer 4 and controlled brake system TEBS of tractor vehicle 2 then constitutes a redundant, or parallel, data link in relation to the wire-bound data exchange via data buses 14, 18 and plug connection 16 between tractor vehicle 2 and trailer 4.

THE LIST OF REFERENCE NUMERALS IS AS FOLLOWS

1 Tractor vehicle/trailer combination
2 Tractor vehicle
4 Trailer
6 Control and monitoring device
8 ECU-TPMS trailer
10 Subassembly
12 Subassembly
14 CAN trailer
16 Coupling
18 CAN tractor vehicle
20 Display device
24 ECU-EBS
26 ECU-TEBS

What is claimed is:

1. A control and monitoring device of a vehicle, comprising:
    at least one controlled brake system, which during braking adjusts at least one of a brake slip and a brake pressure to a setpoint value, including at least one brake control unit; and
    a device for monitoring a tire pressure and a tire air temperature of at least one tire, having at least one tire sensor, which transmits a signal representing at least one of an individual tire pressure and an individual tire air temperature of the particular tire, to at least one tire-monitoring control unit;
    wherein the at least one tire-monitoring control unit and the at least one brake control unit are integrated in one sub-assembly and configured for exchanging data among each other,
    wherein the at least one controlled brake system includes at least one of an anti-lock braking system (ABS) and an electronic braking system (EBS), and wherein the at least one brake control unit includes at least one of an electronic control unit-ABS (ECU-ABS) and an electronic control unit-EBS (ECU-EBS),
    wherein routines are implemented in the at least one EBS brake control unit, with whose aid a brake disk temperature of a brake disk of a disk brake of the vehicle is estimated based on brake and vehicle parameters, including at least one of brake duration, brake pressure, deceleration and vehicle loading, using an estimation algorithm
    wherein a measured tire air temperature is used by the at least one tire-monitoring control unit to estimate a brake disk temperature of a brake disk of the particular tire to provide an estimated brake disk temperature, and
    wherein routines are implemented at least one of in the at least one EBS brake control unit and in the at least one tire-monitoring control unit for verifying the estimated brake disk temperature based on the measured tire air temperature of the tire assigned to the brake disk with respect to the estimated brake disk temperature based on the brake and vehicle parameters, so as to increase a fault tolerance of the brake system.

2. The control and monitoring device of claim 1, wherein the controlled brake system is an anti-lock brake system for a slip-controlled deceleration of the vehicle having at least one of at least one ABS control unit, which adjusts a brake slip in the wheel brakes as a function of a deviation of an actual slip from a setpoint slip, and an electronically controlled brake system having at least one EBS brake control unit, which adjusts a brake pressure in the wheel brakes as a function of a deviation of an actual brake pressure from a setpoint brake pressure.

3. The control and monitoring device of claim 2, wherein the vehicle is a tractor vehicle/trailer combination, the trailer having at least one tire sensor assigned to a trailer tire, and with a trailer tire-monitoring control unit to transmit a signal in a wireless manner to the trailer tire-monitoring control unit, the signal representing at least one of the individual tire pressure and the individual tire air temperature of the respective trailer tire, and the tractor vehicle having at least one tire sensor assigned to a tractor vehicle tire, and with a tractor vehicle tire-monitoring control unit to transmit a signal in a wireless manner to the tractor vehicle tire-monitoring control unit, the signal representing at least one of the particular tire pressure and the particular tire air temperature of the respective trailer tire.

4. The control and monitoring device of claim 1, wherein the vehicle is a tractor vehicle/trailer combination, the trailer having at least one tire sensor assigned to a trailer tire, and with a trailer tire-monitoring control unit to transmit a signal in a wireless manner to the trailer tire-monitoring control unit, the signal representing at least one of the individual tire pressure and the individual tire air temperature of the respective trailer tire, and the tractor vehicle having at least one tire sensor assigned to a tractor vehicle tire, and with a tractor vehicle tire-monitoring control unit to transmit a signal in a wireless manner to the tractor vehicle tire-monitoring control unit, the signal representing at least one of the particular tire pressure and the particular tire air temperature of the respective trailer tire.

5. The control and monitoring device of claim 4, wherein the tractor vehicle tire-monitoring control unit and the trailer tire-monitoring control unit are configured to communicate with one another wirelessly via a high-frequency link, at least in such a way that data about at least one of the tire pressure and the tire air temperature of at least one trailer tire is able to be transmitted to the tractor vehicle tire-monitoring control unit.

6. The control and monitoring device of claim 4, wherein the tractor vehicle is provided with at least one tractor vehicle brake-control unit, and the trailer is provided with at least one trailer brake control unit.

7. The control and monitoring device of claim 6, wherein there is a wireless data exchange between the tractor vehicle brake control unit and the trailer brake control unit, in that the tractor vehicle brake control unit communicates with the tire-monitoring control unit of the tractor vehicle, and the trailer brake control unit communicates with the tire-monitoring control unit of the trailer in such a way that data regarding the controlled brake system of the tractor vehicle and the controlled brake system of the trailer are transmitted via the wireless high-frequency link between the tractor vehicle tire-monitoring control unit and the trailer tire-monitoring control unit.

8. The control and monitoring device of claim 7, wherein the data regarding the controlled brake system of the trailer also includes at least one of diagnosis data and fault data regarding the controlled brake system of the trailer and are read out from at least one of a diagnosis memory and a fault memory of the trailer brake control unit and transmitted via the wireless high-frequency link between the tractor vehicle tire monitoring control unit and the trailer tire-monitoring control unit, to the tractor vehicle brake control unit or to a separate, portable diagnosis device not tied to the vehicle, for at least one of being evaluated and displayed.

9. The control and monitoring device of claim 7, wherein the tractor vehicle brake control unit is integrated with the tire-monitoring control unit of the tractor vehicle, and the trailer brake control unit is integrated with the tire-monitoring control unit of the trailer in one subassembly in each case and configured for the exchange of data among each other.

10. The control and monitoring device of claim 9, wherein the wireless data exchange between the controlled brake system of the trailer and the controlled brake system of the tractor vehicle is provided as a redundant or parallel data link relative to a wire-bound data exchange via a data bus between the tractor vehicle and the trailer.

11. The control and monitoring device of claim 1, wherein the vehicle is a tractor vehicle/trailer combination, the trailer having at least one tire sensor assigned to a trailer tire, and with a trailer tire-monitoring control unit to transmit a signal in a wireless manner to the trailer tire-monitoring control unit, the signal representing at least one of the individual tire pressure and the individual tire air temperature of the respective trailer tire, and the tractor vehicle having at least one tire sensor assigned to a tractor vehicle tire, and with a tractor vehicle tire-monitoring control unit to transmit a signal in a wireless manner to the tractor vehicle tire-monitoring control unit, the signal representing at least one of the particular tire pressure and the particular tire air temperature of the respective trailer tire.

12. The control and monitoring device of claim 11, wherein the tractor vehicle tire-monitoring control unit and the trailer tire-monitoring control unit are configured to communicate with one another wirelessly via a high-frequency link, at least in such a way that data about at least one of the tire pressure and the tire air temperature of at least one trailer tire is able to be transmitted to the tractor vehicle tire-monitoring control unit.

13. The control and monitoring device of claim 11, wherein the tractor vehicle is provided with at least one tractor vehicle brake-control unit, and the trailer is provided with at least one trailer brake control unit.

14. The control and monitoring device of claim 13, wherein there is a wireless data exchange between the tractor vehicle brake control unit and the trailer brake control unit, in that the tractor vehicle brake control unit communicates with the tire-monitoring control unit of the tractor vehicle, and the trailer brake control unit communicates with the tire-monitoring control unit of the trailer in such a way that data regarding the controlled brake system of the tractor vehicle and the controlled brake system of the trailer are transmitted via the wireless high-frequency link between the tractor vehicle tire-monitoring control unit and the trailer tire-monitoring control unit.

15. The control and monitoring device of claim 14, wherein the data regarding the controlled brake system of the trailer also includes at least one of diagnosis data and fault data regarding the controlled brake system of the trailer and are read out from at least one of a diagnosis memory and a fault memory of the trailer brake control unit and transmitted via the wireless high-frequency link between the tractor vehicle tire monitoring control unit and the trailer tire-monitoring control unit, to the tractor vehicle brake control unit or to a separate, portable diagnosis device not tied to the vehicle, for at least one of being evaluated and displayed.

16. The control and monitoring device of claim 14, wherein the tractor vehicle brake control unit is integrated with the tire-monitoring control unit of the tractor vehicle, and the trailer brake control unit is integrated with the tire-monitoring control unit of the trailer in one subassembly in each case and configured for the exchange of data among each other.

17. The control and monitoring device of claim 16, wherein the wireless data exchange between the controlled brake system of the trailer and the controlled brake system of the tractor vehicle is provided as a redundant or parallel data link relative to a wire-bound data exchange via a data bus between the tractor vehicle and the trailer.

18. The control and monitoring device of claim 1, wherein the tire pressure is monitored.

19. The control and monitoring device of claim 1, wherein the tire air temperature is monitored.

20. The control and monitoring device of claim 1, wherein the tire pressure is monitored, and wherein the tire air temperature is monitored.

* * * * *